(12) United States Patent
Zlotnik et al.

(10) Patent No.: US 12,730,563 B2
(45) Date of Patent: Sep. 8, 2026

(54) ASYMMETRIC MEMORY ACCESS

(71) Applicant: Micron Technology, Inc., Boise, ID (US)

(72) Inventors: Leon Zlotnik, Camino, CA (US); Leonid Minz, Beer Sheva (IL)

(73) Assignee: Micron Technology, Inc., Boise, ID (US)

( * ) Notice: Subject to any disclaimer, the term of this patent is extended or adjusted under 35 U.S.C. 154(b) by 28 days.

(21) Appl. No.: 18/918,894

(22) Filed: Oct. 17, 2024

(65) Prior Publication Data

US 2025/0181246 A1 Jun. 5, 2025

Related U.S. Application Data

(60) Provisional application No. 63/605,951, filed on Dec. 4, 2023.

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ..... G06F 3/0613; G06F 3/0659; G06F 3/0673
See application file for complete search history.

(56) References Cited

U.S. PATENT DOCUMENTS

2013/0297865 A1* 11/2013 Gupta .................... G11C 5/066 711/105
2018/0136851 A1* 5/2018 Batra .................... G06F 3/0659
2022/0206707 A1* 6/2022 Kamaraj ............... G06F 3/0604

OTHER PUBLICATIONS

Open NAND Flash Interface Specification, Revision 1.0 Dec. 28, 2006 (Year: 2006).*

* cited by examiner

*Primary Examiner* — Janice M. Girouard
(74) *Attorney, Agent, or Firm* — Brooks, Cameron & Huebsch, PLLC

(57) ABSTRACT

An asymmetric search can be performed by providing a first access command, for a first address of a target memory device, to a first bin of the target memory device, where the target memory device includes a plurality of ports and the first access command is provided to the first bin utilizing a first port. A second access command, for a second address of the target memory device, can be provided to a second bin of the target memory device. The second address can have a first offset from the first address. The second access command can be provided to the second bin utilizing a second port from the plurality of ports. The first access command and the second access command can be provided by an initiator device to the first bin and the second bin via a fabric that connect the initiator device to the target memory device.

20 Claims, 5 Drawing Sheets

PERFORMING AN ASYMETRIC MEMORY ACCESS BY:

PROVIDE A FIRST ACCESS COMMAND, FOR A FIRST ADDRESS OF A TARGET MEMORY DEVICE, TO A FIRST BIN OF THE TARGET MEMORY DEVICE, WHEREIN THE TARGET MEMORY DEVICE INCLUDES A PLURALITY OF PORTS AND THE FIRST ACCESS COMMAND IS PROVIDED TO THE FIRST BIN UTILIZING A FIRST PORT FROM THE PLURALITY OF PORTS — 481

PROVIDE A SECOND ACCESS COMMAND, FOR A SECOND ADDRESS OF THE TARGET MEMORY DEVICE, TO A SECOND BIN OF THE TARGET MEMORY DEVICE, WHEREIN THE SECOND ADDRESS HAS A FIRST OFFSET FROM THE FIRST ADDRESS, WHEREIN THE SECOND ACCESS COMMAND IS PROVIDED TO THE SECOND BIN UTILIZING A SECOND PORT FROM THE PLURALITY OF PORTS, AND WHEREIN THE FIRST ACCESS COMMAND AND THE SECOND ACCESS COMMAND ARE PROVIDED BY AN INITIATOR DEVICE TO THE FIRST BIN AND THE SECOND BIN VIA AN INTERCONNECT THAT CONNECT THE INITIATOR DEVICE TO THE TARGET MEMORY DEVICE — 482

221 222 223-1 223-2 223-3 223-4 223-5 223-6 223-7 223-8

| Add | LSB | S1 | S2 | S3 | S4 | S5 | S6 | S7 | S8 |
|---|---|---|---|---|---|---|---|---|---|
| 0 | 0 | | ←6 | ←7 | ←7 | | ←6 | ←7 | ←5 |
| 1 | 1 | ←5 | ←7 | ←6 | ←8 | ←5 | ←7 | ←6 | |
| 2 | 2 | | ←5 | | ←6 | | ←5 | | ←4 |
| 3 | 3 | ←4 | | ←5 | | ←3 | | ←5 | |
| 4 | 4 | | ←4 | | ←5 | | ←3 | | ←5 |
| 5 | 5 | ←5 | | ←4 | | ←5 | | ←3 | |
| 6 | 6 | | ←5 | | ←4 | | ←5 | | ←3 |
| 7 | 7 | ←3 | | ←5 | | ←4 | | ←5 | |
| 8 | 0 | | ←3 | | ←5 | | ←4 | | ←5 |
| 9 | 1 | ←5 | | ←3 | | ←5 | | ←4 | |
| 10 | 2 | | ←5 | | ←3 | | ←5 | | ←4 |
| 11 | 3 | ←4 | | ←5 | | ←2 | | ←5 | |
| 12 | 4 | | ←4 | | ←5 | | ←2 | | ←5 |
| 13 | 5 | ←5 | | ←4 | | ←5 | | ←2 | |
| 14 | 6 | | ←5 | | ←4 | | ←5 | | ←2 |
| 15 | 7 | ←2 | | ←5 | | ←4 | | ←5 | |
| 16 | 0 | | ←2 | | ←5 | | ←4 | | ←5 |
| 17 | 1 | ←5 | | ←2 | | ←5 | | ←4 | |
| 18 | 2 | | ←5 | | ←2 | | ←5 | | ←4 |
| 19 | 3 | ←4 | | ←5 | | ←3 | | ←5 | |
| 20 | 4 | | ←4 | | ←5 | | ←3 | | ←5 |
| 21 | 5 | ←5 | | ←4 | | ←5 | | ←3 | |
| 22 | 6 | | ←5 | | ←4 | | ←5 | | ←3 |
| 23 | 7 | ←3 | | ←5 | | ←4 | | ←5 | |
| 24 | 0 | | ←3 | | ←5 | | ←4 | | ←5 |
| 25 | 1 | ←5 | | ←3 | | ←5 | | ←4 | |
| 26 | 2 | | ←5 | | ←3 | | ←5 | | ←4 |
| 27 | 3 | ←4 | | ←5 | | ←1 | | ←5 | |
| 28 | 4 | | ←4 | | ←5 | | ←1 | | ←5 |
| 29 | 5 | ←5 | | ←4 | | ←5 | | ←1 | |
| 30 | 6 | | ←5 | | ←4 | | ←5 | | ←1 |
| 31 | 7 | ←1 | | ←5 | | ←4 | | ←5 | |
| 32 | 0 | | ←1 | | ←5 | | ←4 | | ←5 |
| 33 | 1 | ←5 | | ←1 | | ←5 | | ←4 | |
| 34 | 2 | | ←5 | | ←1 | | ←5 | | ←4 |
| 35 | 3 | ←4 | | ←5 | | ←3 | | ←5 | |
| 36 | 4 | | ←4 | | ←5 | | ←3 | | ←5 |
| 37 | 5 | ←5 | | ←4 | | ←5 | | ←3 | |
| 38 | 6 | | ←5 | | ←4 | | ←5 | | ←3 |
| 39 | 7 | ←3 | | ←5 | | ←4 | | ←5 | |
| 40 | 0 | | ←3 | | ←5 | | ←4 | | ←5 |
| 41 | 1 | ←5 | | ←3 | | ←5 | | ←4 | |
| 42 | 2 | | ←5 | | ←3 | | ←5 | | ←4 |
| 43 | 3 | ←4 | | ←5 | | ←2 | | ←5 | |
| 44 | 4 | | ←4 | | ←5 | | ←2 | | ←5 |
| 45 | 5 | ←5 | | ←4 | | ←5 | | ←2 | |
| 46 | 6 | | ←5 | | ←4 | | ←5 | | ←2 |
| 47 | 7 | ←2 | | ←5 | | ←4 | | ←5 | |
| 48 | 0 | | ←2 | | ←5 | | ←4 | | ←5 |
| 49 | 1 | ←5 | | ←2 | | ←5 | | ←4 | |
| 50 | 2 | | ←5 | | ←2 | | ←5 | | ←4 |
| 51 | 3 | ←4 | | ←5 | | ←3 | | ←5 | |
| 52 | 4 | | ←4 | | ←5 | | ←3 | | ←5 |
| 53 | 5 | ←5 | | ←4 | | ←5 | | ←3 | |
| 54 | 6 | | ←5 | | ←4 | | ←5 | | ←3 |
| 55 | 7 | ←3 | | ←5 | | ←4 | | ←5 | |
| 56 | 0 | | ←3 | | ←5 | | ←4 | | ←5 |
| 57 | 1 | ←5 | | ←3 | | ←5 | | ←4 | |
| 58 | 2 | | ←5 | | ←3 | | ←5 | | ←4 |
| 59 | 3 | ←4 | | ←5 | | ←4 | | ←5 | |
| 60 | 4 | | ←4 | | ←5 | | ←4 | | ←5 |
| 61 | 5 | ←5 | | ←4 | | ←5 | | ←4 | |
| 62 | 6 | ←7 | ←5 | | ←4 | ←7 | ←5 | | ←6 |
| 63 | 7 | ←6 | | ←5 | | ←6 | | ←5 | ←7 |

| Add | LSB | S1 | S2 |
|---|---|---|---|
| 0 | 0 | | ←3 |
| 1 | 1 | ←2 | ←3 |
| 2 | 2 | ←3 | ←2 |
| 3 | 3 | ←3 | |
| 4 | 4 | ←2 | |
| 5 | 5 | | ←2 |
| 6 | 6 | | |
| 7 | 7 | ←2 | |
| 8 | 0 | | ←2 |
| 9 | 1 | | |
| 10 | 2 | ←2 | |
| 11 | 3 | | ←2 |
| 12 | 4 | ←1 | |
| 13 | 5 | | ←1 |
| 14 | 6 | ←2 | |
| 15 | 7 | | ←2 |
| 16 | 0 | | |
| 17 | 1 | ←2 | |
| 18 | 2 | | ←2 |
| 19 | 3 | | |
| 20 | 4 | ←2 | |
| 21 | 5 | | ←2 |
| 22 | 6 | | |
| 23 | 7 | ←2 | |
| 24 | 0 | | ←2 |
| 25 | 1 | ←1 | |
| 26 | 2 | | ←1 |
| 27 | 3 | ←2 | |
| 28 | 4 | | ←2 |
| 29 | 5 | | |
| 30 | 6 | ←2 | |
| 31 | 7 | | ←2 |
| 32 | 0 | | |
| 33 | 1 | ←2 | |
| 34 | 2 | | ←2 |
| 35 | 3 | | |
| 36 | 4 | ←2 | |
| 37 | 5 | | ←2 |
| 38 | 6 | ←1 | |
| 39 | 7 | | ←1 |
| 40 | 0 | ←2 | |
| 41 | 1 | | ←2 |
| 42 | 2 | | |
| 43 | 3 | ←2 | |
| 44 | 4 | | ←2 |
| 45 | 5 | | |
| 46 | 6 | ←2 | |
| 47 | 7 | | ←2 |
| 48 | 0 | | |
| 49 | 1 | ←2 | |
| 50 | 2 | | ←2 |
| 51 | 3 | ←1 | |
| 52 | 4 | | ←1 |
| 53 | 5 | ←2 | |
| 54 | 6 | | ←2 |
| 55 | 7 | | |
| 56 | 0 | ←2 | |
| 57 | 1 | | ←2 |
| 58 | 2 | | |
| 59 | 3 | ←2 | |
| 60 | 4 | | ←2 |
| 61 | 5 | | |
| 62 | 6 | ←2 | |
| 63 | 7 | | ←2 |

FIG. 3

PERFORMING AN ASYMETRIC MEMORY ACCESS BY:

PROVIDE A FIRST ACCESS COMMAND, FOR A FIRST ADDRESS OF A TARGET MEMORY DEVICE, TO A FIRST BIN OF THE TARGET MEMORY DEVICE, WHEREIN THE TARGET MEMORY DEVICE INCLUDES A PLURALITY OF PORTS AND THE FIRST ACCESS COMMAND IS PROVIDED TO THE FIRST BIN UTILIZING A FIRST PORT FROM THE PLURALITY OF PORTS — 481

PROVIDE A SECOND ACCESS COMMAND, FOR A SECOND ADDRESS OF THE TARGET MEMORY DEVICE, TO A SECOND BIN OF THE TARGET MEMORY DEVICE, WHEREIN THE SECOND ADDRESS HAS A FIRST OFFSET FROM THE FIRST ADDRESS, WHEREIN THE SECOND ACCESS COMMAND IS PROVIDED TO THE SECOND BIN UTILIZING A SECOND PORT FROM THE PLURALITY OF PORTS, AND WHEREIN THE FIRST ACCESS COMMAND AND THE SECOND ACCESS COMMAND ARE PROVIDED BY AN INITIATOR DEVICE TO THE FIRST BIN AND THE SECOND BIN VIA AN INTERCONNECT THAT CONNECT THE INITIATOR DEVICE TO THE TARGET MEMORY DEVICE — 482

FIG. 4

ASYMMETRIC MEMORY ACCESS

PRIORITY INFORMATION

This application claims the benefit of U.S. Provisional Application No. 63/605,951, filed on Dec. 4, 2023, the contents of which are incorporated herein by reference.

TECHNICAL FIELD

Embodiments of the disclosure relate generally to accessing memory, and more specifically, relate to asymmetric memory access.

BACKGROUND

Various types of electronic devices such as digital logic circuits and memory systems may store and process data. A digital logic circuit is an electronic circuit that processes digital signals or binary information, which can take on two possible values (usually represented as 0 and 1). The digital logic circuit can use logic gates to manipulate and transform the digital signals or binary information. Digital logic circuits can be, for example, used in a wide range of electronic devices including computers, calculators, digital clocks, and many other electronic devices that employ digital processing. Digital logic circuits can be designed to perform specific logical operations on digital inputs to generate digital outputs, and, in some instances, can be combined to form more complex circuits to perform more complex operations. A memory device can include one or more memory devices that store data. The memory devices can be, for example, non-volatile memory devices and volatile memory devices. In general, a host system can utilize a memory system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 2 illustrates an example of asymmetric memory access using a single access command per bin per iteration in accordance with some embodiments of the present disclosure.

FIG. 3 illustrates an example of asymmetric memory access using multiple access commands per bin per iteration in accordance with some embodiments of the present disclosure.

FIG. 4 is a flow diagram corresponding to a method for performing asymmetric memory access in accordance with some embodiments of the present disclosure.

DETAILED DESCRIPTION

Figure 1:
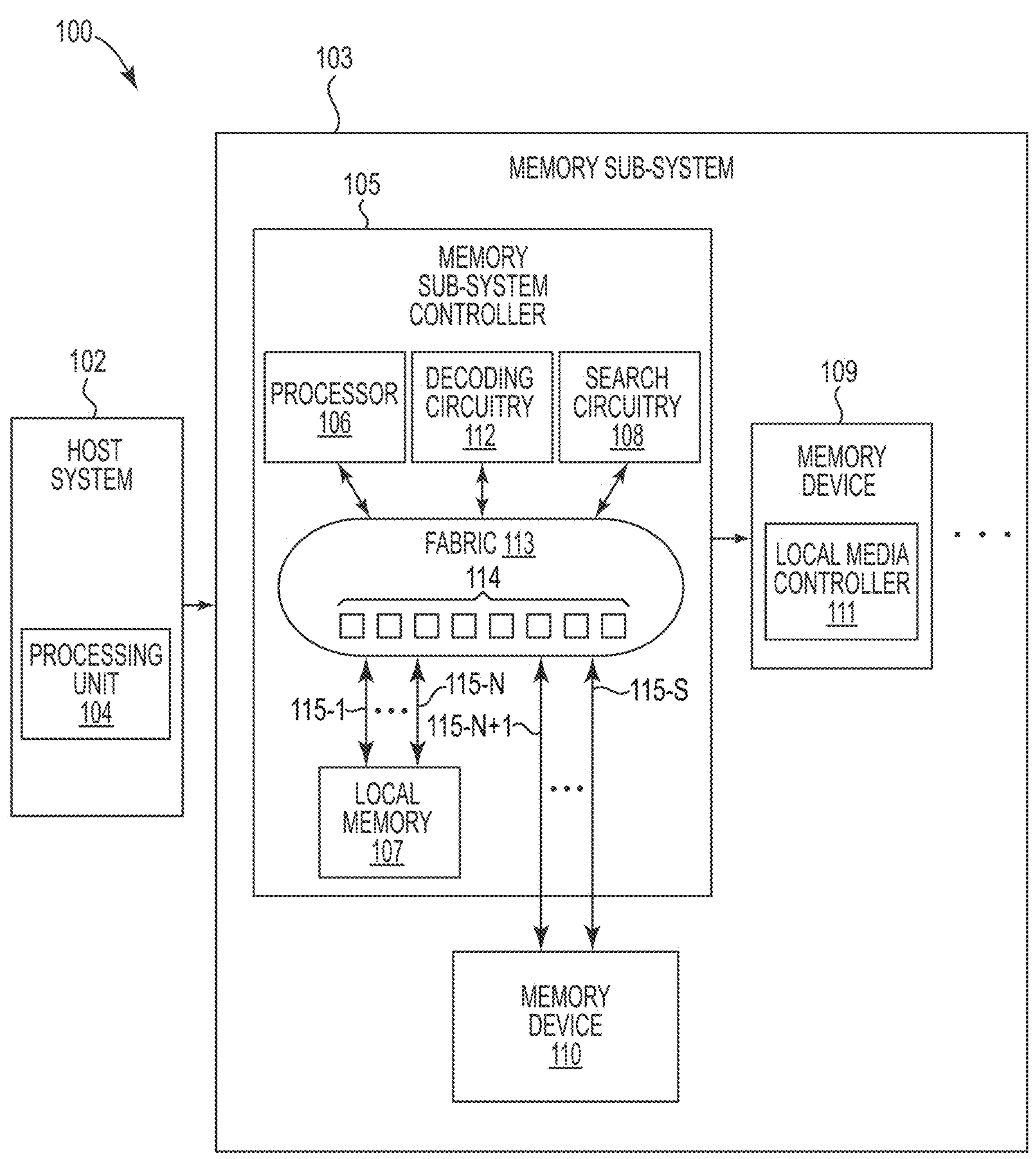
FIG. 1 illustrates an example computing system that includes a memory sub-system in accordance with some embodiments of the present disclosure.

Aspects of the present disclosure are directed to asymmetric memory access. Asymmetric memory access can include providing a first access command, for a first address of a target memory device, to a first bin of the target memory device, wherein the target memory device includes a plurality of ports and the first access command is provided to the first bin utilizing a first port from the plurality of ports. A second access command, for a second address of the target memory device, can be provided to a second bin of the target memory device. The second address can be offset from the first address. The second access command can be provided to the second bin utilizing a second port from the plurality of ports. The first access command and the second access command can be provided by an initiator device to the first bin and the second bin via a fabric that connects the initiator device to the target memory device. The system can be a memory sub-system. The memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

Although some non-limiting examples herein are generally described in terms of applicability to memory sub-systems and/or to memory devices, embodiments are not so limited, and aspects of the present disclosure can be applied as well to systems such as computer systems. The embodiments describe can be applicable to a system-on-a-chip, computing sub-system, data collection and processing, storage, networking, communication, power, artificial intelligence, control, telemetry, sensing and monitoring, digital entertainment and other types of systems/sub-systems and/or devices.

A system, such as a memory sub-system can include a number of memory devices. A number of devices of the system can access the memory device. However, providing multiple access commands having the same address to a memory device can cause one or more of the access commands to not be processed until other access commands are processed. The delay of processing some access commands until other access commands are processed can cause corresponding devices of the memory sub-system to be inefficient which can limit the efficiency of the memory sub-system.

In order to address these and other deficiencies of current approaches, embodiments of the present disclosure distribute the access commands provided to a memory device over multiple ports to limit the quantity of access commands that are not processed until other access commands are processed. Distributing the access commands across the multiple ports allows each port to provide an access command to the memory device for processing which can be faster than providing multiple access commands to the memory device through a same port. Providing multiple access commands and/or data to a memory device across multiple ports can be referred to as asymmetric memory access. The access commands provided to the memory device can be asymmetric given that an attribute (e.g., address of the access commands) of the access commands causes the access commands to be provided to the memory device across multiple ports. For example, addresses of the access commands can cause the access commands to be provided to the memory device utilizing different ports.

The addresses of the access commands can be asymmetric. The addresses can be asymmetric given that each of the addresses can be offset from each other. For example, a second address of a second access command can have a same offset from a first address of the first access command. A third address of a third access command can have the same offset to the second address of the second access command.

FIG. 1 illustrates an example computing system 100 that includes a memory sub-system 103 in accordance with some embodiments of the present disclosure. The memory sub-system 103 can include media, such as one or more volatile memory devices (e.g., memory device 110), one or more non-volatile memory devices (e.g., memory device 109), or a combination of such.

A memory sub-system 103 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

In other embodiments, the computing system 100 can be deployed on, or otherwise included in a computing device such as a desktop computer, laptop computer, server, network server, mobile computing device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. As used herein, the term “mobile computing device” generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of “mobile computing devices” are not so limited, however, and in some embodiments, a “mobile computing device” can refer to an IoT device, among other types of edge computing devices.

The computing system 100 can include a host system 102 that is coupled to one or more memory sub-systems 103. In some embodiments, the host system 102 is coupled to different types of memory sub-system 103. FIG. 1 illustrates one example of a host system 102 coupled to one memory sub-system 103. As used herein, “coupled to” or “coupled with” generally refers to a connection between components, which can be an indirect communicative connection or direct communicative connection (e.g., without intervening components), whether wired or wireless, including connections such as electrical, optical, magnetic, and the like.

The host system 102 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 102 uses the memory sub-system 103, for example, to write data to the memory sub-system 103 and read data from the memory sub-system 103.

The host system 102 includes a processing unit 104. The processing unit 104 can be a central processing unit (CPU) that is configured to execute an operating system. In some embodiments, the processing unit 104 comprises a complex instruction set computer architecture, such an x86 or other architecture suitable for use as a CPU for a host system 102.

The host system 102 can be coupled to the memory sub-system 103 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 103. The host system 102 can further utilize an NVM Express (NVMe) interface to access components (e.g., memory devices 109) when the memory sub-system 103 is coupled with the host system 102 by the PCIe interface. The physical host interface can provide an interface for passing control, address, data, and other signals between the memory sub-system 103 and the host system 102. FIG. 1 illustrates a memory sub-system 103 as an example. In general, the host system 102 can access multiple memory sub-systems via the same communication connection, multiple separate communication connections, and/or a combination of communication connections.

The memory devices 109, 110 can include any combination of the different types of non-volatile memory devices and/or volatile memory devices. The volatile memory devices (e.g., memory device 110) can be, but are not limited to, random access memory (RAM), such as dynamic random-access memory (DRAM) and synchronous dynamic random access memory (SDRAM).

Some examples of non-volatile memory devices (e.g., memory device 109) include negative-and (NAND) type flash memory and write-in-place memory, such as three-dimensional cross-point (“3D cross-point”) memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 109, 110 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 109 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 109 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 109 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 105 (or controller 105 for simplicity) can communicate with the memory devices 109, 110 to perform operations such as reading data, writing data, or erasing data at the memory devices 109, 110 and other such operations. The memory sub-system controller 105 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 105 can be a microcontroller, special purpose logic circuitry (e.g., a field programmable gate array (FPGA), an application specific integrated circuit (ASIC), etc.), or other suitable processor.

The memory sub-system controller 105 can include a processor 106 (e.g., a processing device) configured to execute instructions stored in a local memory 107. In the illustrated example, the local memory 107 of the memory sub-system controller 105 includes an embedded memory configured to store instructions for performing various processes, operations, logic flows, and routines that control operation of the memory sub-system 103, including handling communications between the memory sub-system 103 and the host system 102.

In some embodiments, the local memory 107 can include memory registers storing memory pointers, fetched data, etc. The local memory 107 can also include read-only memory (ROM) for storing micro-code. While the example memory sub-system 103 in FIG. 1 has been illustrated as including the memory sub-system controller 105, in another embodiment of the present disclosure, a memory sub-system 103 does not include a memory sub-system controller 105, and can instead rely upon external control (e.g., provided by an external host, or by a processor or controller separate from the memory sub-system).

In general, the memory sub-system controller 105 can receive commands or operations from the host system 102 and can convert the commands or operations into instructions or appropriate commands to achieve the desired access to the memory device 109 and/or the memory device 110. The memory sub-system controller 105 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 109. The memory sub-system controller 105 can further include host interface circuitry to communicate with the host system 102 via the physical host interface. The host interface circuitry can convert the commands received from the host system into command instructions to access the memory device 109 and/or the memory device 110 as well as convert responses associated with the memory device 109 and/or the memory device 110 into information for the host system 102.

The memory sub-system 103 can also include additional circuitry or components that are not illustrated. In some embodiments, the memory sub-system 103 can include a cache or buffer (e.g., DRAM) and address circuitry (e.g., a row decoder and a column decoder) that can receive an address from the memory sub-system controller 105 and decode the address to access the memory device 109 and/or the memory device 110.

In some embodiments, the memory device 109 includes local media controllers 111 that operate in conjunction with memory sub-system controller 105 to execute operations on one or more memory cells of the memory devices 109. An external controller (e.g., memory sub-system controller 105) can externally manage the memory device 109 (e.g., perform media management operations on the memory device 109). In some embodiments, a memory device 109 is a managed memory device, which is a raw memory device combined with a local controller (e.g., local controller 111) for media management within the same memory device package. An example of a managed memory device is a managed NAND (MNAND) device.

The memory sub-system 103 can include search circuitry 108. Although not shown in FIG. 1 so as to not obfuscate the drawings, the search circuitry 108 (e.g., search engine) can include various circuitry to facilitate aspects of the disclosure described herein in FIG. 2. In some embodiments, the search circuitry 108 can include special purpose circuitry in the form of an ASIC, FPGA, state machine, hardware processing device, and/or other logic circuitry that can allow the search circuitry 108 to access memory such as the local memory 107 and/or the memory device 110, in accordance with the disclosure. In various instances, the search circuitry 108 can be external to the memory sub-system controller 105. Although the examples provided herein are given in the context of the search circuitry 108, the examples can be applied to any initiator (e.g., initiator device) of the local memory 107 and/or the memory device 110.

As used herein, an initiator can include any device that can provide commands to the local memory 107 and/or the memory device 110 and/or that can receive data from the local memory 107 and/or the memory device 110. For example, the processor 106, the search circuitry 108, and/or the decoding circuitry 112 can be initiators of the local memory 107 and/or the memory device 110. For example, each of the processor 106, the search circuitry 108, and/or the decoding circuitry 112 can provide commands to the local memory 107 and/or the memory device 110 and can receive data from the local memory 107 and/or the memory device 110.

The local memory 107 and/or the memory device 110 can be targets. As used herein, a target (e.g., target devices) can be a device that receives commands and/or provides data to an initiator device. The target device can be a multi-port device. The target device can receive and/or provide data via multiple ports. As used herein, a port is an interface that allows the target device to receive data and/or commands and allows the target device to provide data. For example, the local memory 107 can include ports 115-1, . . . , 115-N while the memory device 110 includes ports 115-N+1, . . . , 115-S. The ports 115-1, . . . , 115-N, 115-N+1, . . . , 115-S can be referred to as ports 115. In various examples, the local memory 107 and/or the memory device 110 can each have eight ports, although more or less ports than those described can be implemented.

The initiator devices such as the search circuitry 108 can provide data and/or commands to the target devices via an interconnect such as a fabric 113. The fabric 113 is composed of hardware and/or firmware. As used herein, the fabric 113 is an interface between the initiator devices and the target devices that allows an initiator device having a single port to communicate with a target device having multiple ports. The fabric 113 can include a plurality of arbiters 114. The arbiters 114 can be implemented as hardware and/or firmware. The quantity of arbiters 114 can be equal to the quantity of ports 115 of the local memory 107 and/or the quantity of ports 115 of the memory device 110.

Commands and/or data received through the fabric 113 can be stored in a plurality of buffers (not shown). Each arbiter of the arbiters 114 can have a corresponding buffer that provides commands and/or data to a corresponding arbiter. The arbiters 114 can access commands and/or data from the corresponding buffers and can provide the accessed command and/or data to the local memory 107 and/or the memory device 110 via a corresponding port from the ports 115. The arbiters 114 can employ a policy for selecting commands to provide to the local memory 107 and/or the memory device 110. When multiple commands are stored in a buffer, a command can be selected by a corresponding arbiter while the remaining commands wait to be selected. The remaining commands may not be selected by the arbiter for a number of clock cycles. The initiator devices that provided the remaining commands may wait for the remaining commands to be processed before performing other operations which can introduce inefficiencies to the initiator devices and/or the memory sub-system 103.

As used herein, collision refers to when multiple initiators attempt to access the same target port. The collision of access commands can have an impact on the latency and/or throughput of the initiator devices.

In various instances, the local memory 107 and/or the memory device 110 can store a change log. As used herein, a change log is the documentation of the changes made to the memory sub-system 103 and/or the initiator devices. The local memory 107 and/or the memory device 110 can implement multiple bins. As used herein, a bin is a virtual area of the target device (e.g., local memory 107 and/or the memory device 110). The bins of the target device allow for multiple access commands to be processed concurrently by the target device which cuts down on the latency of the target device.

In various instances, each of the ports 115 of the target device can correspond to a number of bits of an address of the target device. The number of bits of an address of the target device can include least significant bits (LSBs), most significant bits (MSBs), or any combination of the bits of the address. For example, the number of bits of the address can include middle bits of the address. As used herein, a LSB is the least weighted bit in a bit string such as an address. A MSB is the most weighted bit in the bit string. Middle bits can describe bits between the LSB and the MSB of a bit string.

Each buffer can store access commands having different LSBs, MSBs, or middle bits. While the examples provided herein are given in the context of utilizing LSBs, the examples provided herein can be implemented using MSBs or middle bits of an address. The examples can also be implemented bits that are not part of the address. A first buffer can store access commands having a first plurality of LSBs while a second buffer stores access commands having a second plurality of LSBs.

The arbiters 114 can select access commands from the corresponding buffers. For example, a first arbiter can select commands from the first buffer such that the first arbiter processes access commands having the first plurality of LSBs while a second arbiter selects commands from the second buffer such that the second arbiter processes access commands having the second plurality of LSBs. The arbiters 114 provide access commands to the ports 115 such that each port is associated with a different LSB. For example, the port 115-1 can receive access commands having the first plurality of LSBs while a second port receives access commands having the second plurality of LSBs.

The bins are a virtual area of the target device that allows access to a rank (or bank) of memory cells of the target device. Each of the ports 115 can provide access to each of the bins. In a number of examples, the initiator devices can access different bins by providing different address bits (such as LSBs or MSBs) to increase the throughput and utilization of the target device. The initiator device is not limited to providing LSBs of an address to differentiate between bins and/or ranks. The initiator device can provide MSBs or middle bits of an address to differentiate between bins and/or ranks. The initiator device can also provide bits that are not part of an address to differentiate between bins and/or ranks. For instance, the search circuitry 108 may search the target device for a target data. The target device may store ordered data. The data stored by the target device may have multiple entries of the target data or may not store the target data. The initiator device may search two or more of the bins concurrently by providing access commands to the two or more bins through different ports. As used herein, "concurrence" describes the execution of access commands at the same time or at relatively the same time.

The target device may return data stored at the accesses corresponding to the access commands. The initiator device may perform operations on the data such as comparison operations. The initiator device may generate additional access commands to further search through the data stored by the target device until the data is found or is not found. Providing access commands through different ports limits the quantity of collisions which increases the throughput of the target device.

In some embodiments, the memory sub-system controller 105 includes at least a portion of the search circuitry 108. For example, the memory sub-system controller 105 can include a processor 106 (processing device) configured to execute instructions stored in local memory 107 for performing the operations described herein. In some embodiments, the search circuitry 108 is part of the host system 103, an application, or an operating system. The search circuitry 108 can be resident on the memory sub-system 103 and/or the memory sub-system controller 105. As used herein, the term "resident on" refers to something that is physically located on a particular component. For example, the search circuitry 108 being "resident on" the memory sub-system 103 refers to a condition in which the hardware circuitry that comprises the search circuitry 108 is physically located on the memory sub-system 103. The term "resident on" may be used interchangeably with other terms such as "deployed on" or "located on," herein.

FIG. 2 illustrates an example of asymmetric memory access using a single access command per bin per iteration in accordance with some embodiments of the present disclosure. FIG. 2 includes addresses 221, LSB 222, and bins 223-1 (S1), 223-2 (S2), 223-3 (S3), 223-4 (S4), 223-5 (S5), 223-6 (S6), 223-7 (S7), 223-8 (S8), collectively referred to as bins 223. The bins 223 can include eight 64 entries. The example of FIG. 2 is provided to describe the distribution of access commands across multiple ports to allow for a greater throughput of the target device. The access commands can be provided from an initiator device. FIG. 2 is an example of a number of iterations of a plurality of searches conducted by the initiator device.

Each iteration of the plurality of searches is labeled as a first iteration (1), a second iteration (2), a third iteration (3), a fourth iteration (4), a fifth iteration (5), a sixth iteration (6), a seventh iteration (7), and an eighth iteration (8). The initiator device can provide a plurality of access commands in each iteration of the plurality of searches. In a number of examples, a single access command can be provided by the initiator device for each iteration of a search. The example of FIG. 2 illustrates eight searches conducted concurrently.

The addresses 221 correspond to addresses of the target device. The addresses 221 also correspond to addresses of the access commands. The LSBs 222 can be LSBs of the addresses 221. The addresses 221 and the LSBs 222 are provided as decimal numbers. The addresses 221 and the LSBs 222 can also be represented using binary numbers. For example, an address “31” shown as a decimal number can be “11111” as a binary number. The LSBs of the address “11111” can be “111”. The LSBs of “111” is “7” as a decimal number. Although the example of FIG. 2 is given in terms of LSBs 222, the example of FIG. 2 can also be implemented utilizing MSBs or middle bits of the address. The examples can be given in terms of bits that are not part of an address.

The initiator device, in a first iteration of a plurality of searches, can provide a first access command for an address “31” to the bin 223-1 (S1). The first access command having the address “31” can be routed to a port corresponding to the LSBs “7” of the address “31”. The initiator device can provide a second access command for an address “32” to the bin 223-2 (S2). The second access command having the address “32” can be routed to a port corresponding to the LSBs “0” of the address “32”. The initiator device can provide a third access command for an address “33” to the bin 223-3 (S3). The third access command having the address “33” can be routed to a port corresponding to the LSBs “1” of the address “33”. The initiator device can provide a fourth access command for an address “34” to the bin 223-4 (S4). The fourth access command having the address “34” can be routed to a port corresponding to the LSBs “2” of the address “34”. The initiator device can provide a fifth access command for an address “27” to the bin 223-5 (S5). The fifth access command having the address “27” can be routed to a port corresponding to the LSBs “3” of the address “27”. The initiator device can provide a sixth access command for an address “28” to the bin 223-6 (S6). The sixth access command having the address “28” can be routed to a port corresponding to the LSBs “4” of the address “28”. The initiator device can provide a seventh access command for an address “29” to the bin 223-7 (S7). The seventh access command having the address “29” can be routed to a port corresponding to the LSBs “5” of the address “29”. The initiator device can provide an eighth access command for an address “30” to the bin 223-8 (S8). The eighth access command having the address “30” can be routed to a port corresponding to the LSBs “6” of the address “30”.

The first access command can be part of a first search. The second access command can be part of a second search. The third access command can be part of a third search. The fourth access command can be part of a fourth search. The fifth access command can be part of a fifth search. The sixth access command can be part of a sixth search. The seventh access command can be part of a seventh search. The eighth access command can be part of an eighth search.

The access commands of a same iteration of the plurality of searches can be offset from one another. The address of the second access command can be offset from the address of the first access command. The offset, in the example shown in FIG. 2, is one. For instance, the second access command has an address of “32” while the first access command has an address of “31”. The offset of the third access command from the second access command can also be one. Each of the access commands can have an offset of one as compared to a previous access command.

The first search can be a binary search. The first search can begin at the middle of the addresses 221. For instance, the addresses 221 span from address “0” to address “63”. The middle address is an address “31”. Each of the other searches can be offset from the first search because they do not begin at address “31”.

The access commands do not collide in the fabric because the access commands are provided through different ports and do not have to wait for different access commands to be processed before they are processed. Each of the bins 223 can return corresponding data that is stored in the memory cells having the addresses described. For example, the bin 223-1 (S1) can provide first data retrieved from memory cells having the address “31” while the bin 223-2 (S2) can provide second data retrieved from memory cells having the address “32”.

The search circuitry can perform a plurality of operations on the data received from the bins 223. For example, the search circuitry can compare a target data with the data received from the bins 223. If a match is identified, then a corresponding search can conclude. For instance, if the target data matches the first data of a first bin, then the first search corresponding to the first bin can conclude. The other searches corresponding to other bins can continue. For example, a second search conducted using the bin 223-2 can continue.

If the data received from the bins 223 is larger than the target data, then a corresponding search can provide an access command for an address that is smaller than the address of a previous access command if the data stored in the bins 223 is sorted in ascending order from address “0” to address “63”. If the data received from the bins 223 is smaller than the target data, then a corresponding search can provide an access command for an address that is larger than the address of a previous access command if the data stored in the bins 223 is sorted in a descending order from address “63” to address “0”.

Each iteration, after the first iteration, of the plurality of searches can include access commands that are offset from a previous access command of respective searches by a same offset. For example, an access command corresponding to a second iteration of the first search can have an address “15” or an address “47”. Each of the addresses “15” and “47” can have an offset of 16 addresses from the address “31” of the previous access command (e.g., the first access command) of the first search. An access command corresponding to the second iteration of the second search can have an address "16" or an address "48". Each of the addresses "16" and "48" can have an offset of 16 addresses from the address "32" of the previous access command (e.g., the second access command) of the second search. In a second iteration, the access commands do not collide because they are received by the target device through different ports. For instance, the access command of the second iteration of the second search is received by a port corresponding to "7" LSBs (e.g., the least significant bits of the addresses "15" and "47").

For example, the third iteration of the plurality of searches can include access commands that are offset from access commands of the second iteration of the plurality of searches by 8 addresses. Each subsequent iteration of the plurality of searches can reduce the offset of the access commands by half. For instance, the offset of the access command from a second iteration as compared to a first iteration can be 16 addresses. The offset of the access commands from the third iteration as compared to the second iteration can be 8 addresses. The offset of the access commands from the fourth iteration as compared to the third iteration can be 4 addresses. The offset of the access command from the fifth iteration as compared to the fourth iteration can be 2 addresses, etc.

Based on the starting addresses of the access commands of the first iteration of the plurality of searches, each of the searches may have a different quantity of potential iterations. For example, the first search performed by the bin 223-1 (S1) can include up to 7 iterations while the fourth search performed by the bin 223-4 (S4) can include up to 8 iterations.

In various examples, each of the searches can conclude at a different iteration based on whether the data being searched for is found or is not found. For instance, if data being searched for is found in a first iteration of a first search, the first search can conclude while the other searches continue.

FIG. 2 shows eight access requests in each of the iterations. However, more or less access requests can be provided per iteration. For instance, a first iteration can include two access requests. A subset of the bins can be searched using a single access command per iteration. For example, a first access request can be provided to the bin 223-1 (S1) as part of a first iteration of a first search while a second access request is provided to the bin 223-2 (S2) as part of the first iteration of the first search. Each of the access requests can have addresses that have different LSBs 222 spanning from "000" LSBs to "111" LSBs.

The access commands can be provided using rank interleaving with a minimal collision probability. Each rank of the memory device and/or local memory can be associated with a different LSB. For example, the addresses having the "000" LSBs can be stored in a first rank while the addresses having the "001" LSBs can be stored in a second rank. In the example of FIG. 2 there are eight ranks. However, more or less ranks than those described herein can be implemented in the memory device and/or local memory. The term "rank interleaving" describes that each access request is provided to a different rank. For instance, a first access command having a first address with first LSBs can be used to retrieve data from a first rank while a second access command having a second address with second LSBs can be used to retrieve data from a second rank. The bins 223 can access each of the banks and are not limited to accessing one or some of the banks.

Each rank can be associated with a port that is selected based on the LSBs, MSBs, middle bits of an address, and/or bits that are not part of the address. Simultaneous access to different ranks is available due to a separate port per rank allocation. The separate port per rank allocation allows for a more efficient operation than utilizing a port to access multiple ranks. A port can be used to access a number of ranks. A bin can be accessed by interleaving between the ranks. Accessing multiple ranks utilizing a bin allows ports to be available (unblocked) for additional accesses. A bin can span multiple ranks. In various examples, a first port can be used to access a first rank utilizing a first bin concurrently with the use of a second port to access a second rank utilizing a second bin.

As described, there may be more than the eight bins shown in FIG. 2. For instance, the sixteen bins can be arraigned in two clusters. Each cluster can include eight bins. If the number of bins is not divisible by 8, the remaining bins can be arranged in a sequential manner. For example, twenty bins can be arranged in two clusters of eight bins and one cluster of four bins. In examples where bins are configured as clusters, the clusters can be searched. For example, eight searches can be performed on the first cluster and eight different searches can be performed on the second cluster. If eight ports are controlled by the LSBs, then eight bins can be implemented per cluster. If four ports are controlled by the LSBs, then four bins can be implemented per cluster, among other examples of the quantity of bins that are implemented per cluster.

The bins 223 may be of different sizes. For example, the bin 223-1 (S1) can provide access to a greater number of addresses than the bin 223-2 (S2) can provide access to. A cluster of bins can include different sized bins 223. For instance, the bin 223-1 (S1) providing access to a first number of addresses and the bin 223-2 (S2) providing access to a second number of addresses can be included in a same cluster. In various examples, it may be beneficial to group bins having the same size or relatively the same size in a cluster. For example, grouping four bins of 1024 entries with four bins of 4096 entries in a cluster and four bins of 128 entries with four bins of 256 entries into another cluster can be more optimal than grouping bins having 1024 entries and 64 entries into a cluster or grouping bins having 4096 entries and 256 entries into a cluster. Grouping similar sized bins into a cluster allows the similar sized bins to conclude a search in a same number of iterations or in a similar number of iterations as compared to combining bins of different sizes into a cluster.

FIG. 3 illustrates an example of asymmetric memory access using multiple access commands per bin per iteration in accordance with some embodiments of the present disclosure. FIG. 3 includes addresses 321, LSBs 322, and bins 323-1, 323-2, referred to as bins 323. The example of FIG. 3 illustrates the use of multiple access commands per bin per iteration of a plurality of searches. The bins 323 include two bins each having 64-entries. Although the example of FIG. 3 is provided in terms of LSBs 322, the examples of FIG. 3 can also be implemented using MSB, middle bits, or bits that are not part of an address.

The search of the bins 323 can be performed in a parallel (e.g., speculative) manner as compared to the searches conducted in FIG. 2. A search can be performed in parallel if multiple access commands are provided to a bin at a same time and the multiple access commands are processed by the bin at relatively the same time. An access command can be speculative if data retrieved responsive to an access command is utilized to determine whether the data received utilizing a different access command can be utilized to determine whether a bin stores a target data. Examples of speculative access commands are provided below.

As used here, a read-compare operation can include providing an access command to a bin, receiving data retrieved from the bin, and comparing the received data to target data. The received data can be compared to the target data to determine whether the received data is the target data, whether the received data is smaller than the target data, or whether the received data is larger than the target data. Read-compare operations can be performed in the context of a binary search. The example of FIG. 3 shows four read-compare operations being performed per iteration of a search. The four read-compare operations can include four access commands being executed by a bin.

For example, a first access command of a first binary search can be for an address “24” having “1” as the LSBs. Traditionally, a comparison would be made utilizing the data returned from the first access command prior to selecting a next address to search. In various instances, the three other access commands can be provided to the bin 323-1 prior to comparing the data received from the first access commands.

The second access command of the first iteration of the first binary search can be for an address “12” having “4” as the LSBs. The third access command of the first iteration of the first binary search can be for an address “38” having “6” as the LSBs. The fourth access command for the first iteration of the first binary search can be for an address “51” having “3” as the LSBs. The first, second, third, and fourth access commands of the first iteration of the first binary search can be provided to the bin 323-1 at relatively the same time and can be processed by the bin 323-1 at relatively the same time. There is no collision between the first, second, third, and fourth access commands because the LSBs (e.g., “1”, “4”, “6”, “3”) are different. Given that the LSBs are different, different ports are utilized to access ranks via the bins. Bins are virtual in that the bins are located in memory across the ranks. The different ports can provide the access commands to the different ranks of memory devices.

The distance between the first, second, third, and fourth access commands can be equal. For example, the distance between the first access command and the second access command can be thirteen entries while the distance between the first access command and the third access command and between the third access command and the fourth access command is also thirteen entries. The access commands provided to a bin can be equally offset from each other because the distance between the first, second, third, and fourth access commands is the same. In various examples, the distance between the first, second, third, and fourth access commands can be unequal. For example, the distance between the first access command and the second access command can be a first quantity of entries while the distance between the third access command and the fourth access command is a different quantity of entries.

Four access commands can also be provided to the bin 323-2 at relatively the same time through different ports. For example, a first, second, third and fourth access commands of a first iteration of a second search can be provided to the bin 323-2. The first access command of the first iteration of the second search can be for an address “26” having “2” as the LSBs. The second access command of the first iteration of the second search can be for an address “13” having “5” as the LSBs. The third access command of the first iteration of the second search can be for an address “39” having “7” as the LSBs. The fourth access command for the first iteration of the second search can be for an address “52” having “4” as the LSBs. The first, second, third, and fourth access commands of the first iteration of the second search can be provided to the bin 323-2 at relatively the same time and can be processed by the bin 323-2 at relatively the same time. The first, second, third, and fourth access commands of the first iteration of the second search can be provided utilizing different ports than the ports utilized to provide the first, second, third, and fourth access commands of the first binary search.

The offset between the first, second, third, and fourth access commands of the first iteration of the second search and the first, second, third, and fourth access commands of the first iteration of the first binary search can have a same offset. For example, the offset between the first, second, third, and fourth access commands of the first iteration of the first binary search can be thirteen entries and the offset between the first, second, third, and fourth access commands of the first iteration of the second binary search can also be thirteen entries.

Each of the first, second, third, and fourth access commands of the first iteration of the second search can have a same offset from the corresponding first, second, third, and fourth access commands of the first iteration of the first binary search. For example, the first access command of the first iteration of the second search can have an offset of one entry from the first access command of the first iteration of the first search. The second access command of the first iteration of the second search can also have an offset of one entry from the second access command of the first iteration of the first search. The third access command of the first iteration of the second search can also have an offset of one entry from the third access command of the first iteration of the first search. The fourth access command of the first iteration of the second search can also have an offset of one entry from the fourth access command of the first iteration of the first search.

Each of the first, second, third, and fourth access commands of the first iteration of the first binary search and the first, second, third, and fourth access commands of the first iteration of the second binary search can be provided to the corresponding bins 323 at relatively the same time. Each of the first, second, third, and fourth access commands of the first iteration of the first binary search and the first, second, third, and fourth access commands of the first iteration of the second binary search can be processed by the corresponding bins 323 at relatively the same time even though the second, third, and fourth access commands of the first iteration of the first binary search and the second, third, and fourth access commands of the first iteration of the second search are speculative. Data received by processing the first access command of the first iteration of the first binary search and the first access command of the first iteration of the second binary search can be utilized to lead to a next iteration. A next iteration can also include four additional access commands per search, three of the access commands being speculative.

Although four access commands are described as being provided per search per iteration, more or less access commands can be provided per search per iteration. Providing multiple access commands per search per iteration can have the benefit of converging in a lower number of iterations as compared to providing a single access command per search per iteration. In the example of FIG. 3, a 64-entry bin finishes a search in just three iterations while the 64-entry bins of FIG. 2 finish their search in seven to eight iterations. Considering a fabric latency of 20 clocks, the example of FIG. 2 utilizes up to 160 clocks to complete a search (e.g., eight iterations). The example of FIG. 3 utilizes up to 60 clocks to complete a search.

Another advantage of providing four access commands per search per iteration is that only two bins are utilized to generate eight sequential access commands as compared to the example of FIG. 2 where eight bins are utilized to generate eight sequential access commands. Providing multiple access commands per search per iteration can allow for multiple bins of different size to be utilized in a cluster.

The data volume experienced by the fabric in the example of FIG. 2 can be higher than the data volume experienced in the example of FIG. 3. The data volume can be lower because the number of iterations utilized in FIG. 3 is lower than the number of iterations utilized in FIG. 2. The higher data volume can be mitigated by introducing additional read initiators (e.g., bridge) from the search circuitry to the fabric. The data can be read via two or more initiator ports rather than one port. For example, the search circuitry can be coupled to the fabric utilizing two ports instead of one port. Given that most of the access commands of the first search and the second search are arranged in sequence, the read stream from the two initiator bridges can interleave one after another at the memory side without any collisions. The memory device and/or the local memory can accept up to eight sequential streams without collisions. The higher data volume can result in a higher power use which can be offset by the faster convergence.

FIG. 4 is a flow diagram corresponding to a method 480 for performing asymmetric memory access in accordance with some embodiments of the present disclosure. The method 480 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 480 is performed by the search circuitry 108 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 480 includes performing asymmetric memory accesses. At operation 481, a first access command, for a first address of a target memory device, can be provided to a first bin of the target memory device. The target memory device can include a plurality of ports and the first access command is provided to the first bin utilizing a first port from the plurality of ports. An initiator memory device can provide the first access command via an interconnect that couples the initiator device to the target memory device.

At operation 482, a second access command, for a second address of the target memory device, can be provided to a second bin of the target memory device. The second address has a first offset from the first address. The second can be provided to the second bin utilizing a second port from the plurality of ports. The first access command and the second access command are provided by an initiator device to the first bin and the second bin via an interconnect that connects the initiator device to the target memory device. The offset between the second address and the first address can include a number of addresses that can be described as entries of one or more bins. As used herein, an interconnect can include buses, networks, and/or fabrics, among other examples of an interconnect. The interconnect can be a network on chip (NoC) interconnect, a multiplexed interconnect, a ring interconnect, a message and a package based interconnect, and/or a time division based interconnect, among others. Although the examples provided herein are given in relation to a fabric (e.g., fabric 113 of FIG. 1), the examples can be extended to an interconnect.

Responsive to the second address being offset from the first address, the second access command can be provided utilizing the second port. The offset between the first access command and the second access command can cause the first access command to be for a different address than the second access command. The different addresses of the first access command and the second access command can have different LSBs. The different LSBs can be associated with different ports. The second access command can be provided via a different port than the first access command because the addresses of the second access command and the first access command have different LSBs.

The initiator memory device can receive the first data responsive to providing the first access command and second data responsive to providing the second access command. The first data can be data stored at the first address of the first bin. The second data can be data stored at the second address of the second bin. The first data and the second data can be received from the slave memory device through the interconnect.

The initiator memory device can perform a first plurality of operations utilizing the first data and a second plurality of operations utilizing the second data. For instance, the initiator memory device can compare the first data to a target data. The target data can be data that is being searched for. The initiator memory device can also compare the second data to the target data. The initiator memory device can search for the first data in the first bin and the second data in the second bin. The comparisons can be performed as part of a plurality of searches for the target data. The comparison of the first data to the target data can be performed as part of a first search. The comparison of the second data to the target data can be performed as part of the second search. Although the examples described herein are provided in the context of a plurality of searches, the examples can be applied to other types of operations. For example, the initiator memory device can perform operations on the first data and the second data. The results of the operations can be utilized to select a next address of the first bin and a next address of the second bin. The initiator memory device can provide access commands for the next address of the first bin and access commands for the next address of the second bin.

For example, the initiator memory device can provide a third access command, for a third address of the target memory device, to the first bin of the target memory device responsive to performing the first plurality of operations. The third access command can be provided to the first bin utilizing the first port from the plurality of ports. The initiator memory device can provide fourth access command, for a fourth address of the target memory device, to the second bin of the target memory device responsive to performing the second plurality of operations, wherein the fourth access command is provided to the second bin utilizing the second port from the plurality of ports.

The third address can have a second offset from the first address. The fourth address can also have the second offset from the second address.

In various instances, a memory sub-system can include a target device and an initiator device. The target device includes a plurality of ports. The initiator device can be coupled to the target device. The initiator device can perform a plurality of searches utilizing a plurality of bins of the target device and the plurality of ports. Each iteration of a search from the plurality of searches can be performed using a single bin and a single port. For example, the initiator device can provide access commands to the single bin utilizing a single port for a first iteration of a search. The first search from the plurality of searches can be a binary search which begins at a first address and utilizes a first port from the plurality of ports and a first bin from the plurality of bins. The second search from the plurality of searches begins at a second address that is offset from the first address and utilizes a second port from the plurality of ports and a second bin from the plurality of bins.

In various examples, each search of the plurality of searches utilizes a different bin from the plurality of bins. Each search of the plurality of searches utilizes a different port from the plurality of ports. Utilizing a different port allows for multiple access commands to be provided without collisions. The initiator device can provide a plurality of access commands to the plurality of bins, wherein the plurality of access commands is provided in a first iteration of the plurality of searches. Each search can be performed in iterations. The initiator device can also provide each access command from the plurality of access commands utilizing a different port from the plurality of ports. For example, a first access command can be provided to the target device via a first port and the second access command can be provided to the target device via a second port.

The first address has a first plurality of bits. The second address can also have a second plurality of bits. The first plurality of bits and the second plurality of bits can be different. The first plurality of bits and the second plurality of bits can have a same index within the first address and the second address. For example, the first plurality of bits can be a first plurality of LSBs and the second plurality of bits can a second plurality of LSB. The first plurality of bits and the second plurality of bits can also be the most significant bits (MSB). The difference in the bits can lead to the utilization of different ports to provide the first access command and the second access command. Each of the ports can be associated with one of the first plurality of bits or the second plurality of bits such that access commands for addresses having particular bits from the first plurality of bits and the second plurality of bits are provided via a corresponding port. The initiator device is configured to provide a first access command corresponding to the first search via the first port corresponding to the first plurality of bits of the first address, wherein the first access command is for the first address. The initiator device can also provide a second access command corresponding to the second search via the second port corresponding to the second plurality of bits of the second address, wherein the second access command is for the second address.

In various examples, a memory sub-system can include a target device that includes a first plurality of ports and a second plurality of ports. The memory sub-system can also include an initiator device coupled to the target device. The initiator device can perform a first search utilizing a first bin of the target device and the first plurality of ports. The initiator device can also perform a second search utilizing a second bin of the target device and the second plurality of ports. A first iteration of the first search can begin at a first plurality of addresses. The first iteration of the first search can utilize the first plurality of ports and the first bin from a plurality of bins of the target device. The first iteration of the second search can begin at a second plurality of addresses and utilizes the second plurality of ports and the second bin from the plurality of bins. Multiple access commands can be provided to a bin per iteration of the search. The access commands can include read commands, for example, but may include other types of access commands.

The first plurality of addresses can have a first offset from the second plurality of addresses. In various instances, the offset can be an offset of one. Although, different offsets can be utilized. Each address of the first plurality addresses can have a second offset from a different address of the first plurality of addresses. Each address of the second plurality of addresses can have the second offset from a different address of the second plurality of addresses.

Figure 5:
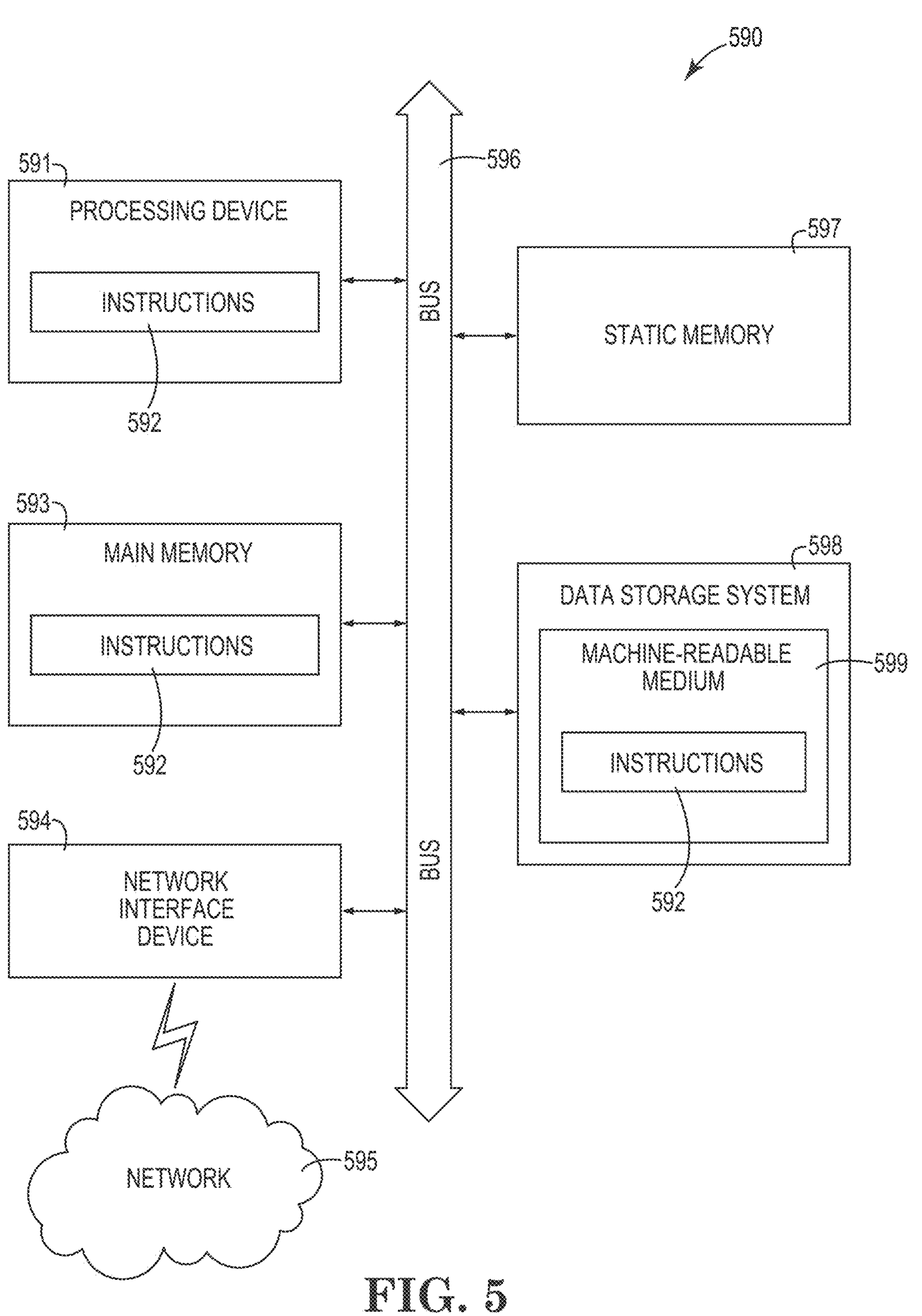
FIG. 5 is a block diagram of an example computer system in which embodiments of the present disclosure may operate.

FIG. 5 is a block diagram of an example computer system in which embodiments of the present disclosure may operate. For example, FIG. 5 illustrates an example machine of a computer system 590 within which a set of instructions, for causing the machine to perform any one or more of the methodologies discussed herein, can be executed. In some embodiments, the computer system 590 can correspond to a host system (e.g., the host system 102 of FIG. 1) that includes, is coupled to, or utilizes a memory sub-system (e.g., the memory sub-system 103 of FIG. 1) or can be used to perform the operations of a controller (e.g., to execute an operating system to perform operations corresponding to the search circuitry 108 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 590 includes a processing device 591, a main memory 593 (e.g., read-only memory (ROM), flash memory, dynamic random access memory (DRAM) such as synchronous DRAM (SDRAM) or Rambus DRAM (RDRAM), etc.), a static memory 597 (e.g., flash memory, static random access memory (SRAM), etc.), and a data storage system 598, which communicate with each other via a bus 596.

The processing device 591 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 591 can also be one or more special-purpose processing devices such as an application specific integrated circuit (ASIC), a field programmable gate array (FPGA), a digital signal processor (DSP), network processor, or the like. The processing device 591 is configured to execute instructions 592 for performing the operations and steps discussed herein. The computer system 590 can further include a network interface device 594 to communicate over the network 595.

The data storage system 598 can include a machine-readable storage medium 599 (also known as a computer-readable medium) on which is stored one or more sets of instructions 592 or software embodying any one or more of the methodologies or functions described herein. The instructions 592 can also reside, completely or at least partially, within the main memory 593 and/or within the processing device 591 during execution thereof by the computer system 590, the main memory 593 and the processing device 591 also constituting machine-readable storage media. The machine-readable storage medium 599, data storage system 598, and/or main memory 593 can correspond to the memory sub-system 103 of FIG. 1.

In one embodiment, the instructions 592 include instructions to implement functionality corresponding to search circuitry (e.g., the search circuitry 108 of FIG. 1). While the machine-readable storage medium 599 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

providing a first access command, for a first address of a target memory device, to a first bin of the target memory device, wherein the target memory device includes a plurality of ports and the first access command is provided to the first bin utilizing a first port from the plurality of ports and wherein each of the plurality of ports provides access to each of a plurality of bins including the first bin and a second bin and each of the first bin and the second bin provide access to each address of the target memory device; and providing a second access command, for a second address of the target memory device, to the second bin of the target memory device, wherein the second address has a first offset from the first address, wherein the second access command is provided to the second bin utilizing a second port from the plurality of ports, and wherein the first access command and the second access command are provided by an initiator device to the first bin and the second bin via an interconnect that connects the initiator device to the target memory device.

2. The method of claim 1, wherein, responsive to the second address being offset from the first address, providing the second access command utilizing the second port.

3. The method of claim 1, further comprising:
receiving first data responsive to providing the first access command; and
receiving second data responsive to providing the second access command.

4. The method of claim 3, further comprising performing a first plurality of operations utilizing the first data and a second plurality of operations utilizing the second data.

5. The method of claim 4, further comprising:
providing a third access command, for a third address of the target memory device, to the first bin of the target memory device responsive to performing the first plurality of operations, wherein the third access command is provided to the first bin utilizing the first port from the plurality of ports; and
providing a fourth access command, for a fourth address of the target memory device, to the second bin of the target memory device responsive to performing the second plurality of operations, wherein the fourth access command is provided to the second bin utilizing the second port from the plurality of ports.

6. The method of claim 5, wherein the third address has a second offset from the first address.

7. The method of claim 6, wherein the fourth address has the second offset from the second address.

8. The method of claim 6, wherein the fourth address has the first offset from the third address.

9. An apparatus, comprising:
a target device that includes a plurality of ports, wherein each of the plurality of ports provides access to each of a plurality of bins and each of the plurality of bins provides access to each address of the target device;
an initiator device coupled to the target device and configured to:
perform a plurality of searches utilizing the plurality of bins of the target device and the plurality of ports;
wherein a first search from the plurality of searches is a binary search which begins at a first address and utilizes a first port from the plurality of ports and a first bin from the plurality of bins; and
wherein a second search from the plurality of searches begins at a second address that is offset from the first address and utilizes a second port from the plurality of ports and a second bin from the plurality of bins.

10. The apparatus of claim 9, wherein each search of the plurality of searches utilizes a different bin, that is different, from the plurality of bins.

11. The apparatus of claim 9, wherein the initiator device configured to perform the plurality of searches is further configured to provide a plurality of access commands to the plurality of bins, wherein the plurality of access commands is provided in a first iteration of the plurality of searches.

12. The apparatus of claim 11, wherein the initiator device is further configured to provide each access command from the plurality of access commands utilizing a different port from the plurality of ports.

13. The apparatus of claim 9, wherein the first address has a first plurality of bits.

14. The apparatus of claim 13, wherein the second address has a second plurality of bits.

15. The apparatus of claim 14, wherein the first plurality of bits and the second plurality of bits are different.

16. The apparatus of claim 15, wherein the initiator device is configured to:
provide a first access command corresponding to the first search via the first port corresponding to a first plurality of least significant bits (LSBs) of the first address, wherein the first access command is for the first address; and
provide a second access command corresponding to the second search via the second port corresponding to a second plurality of LSBs of the second address, wherein the second access command is for the second address.

17. An apparatus, comprising:
a target device that includes a first plurality of ports and a second plurality of ports wherein each of the first plurality of ports and the second plurality of ports provides access to each of a plurality of bins and each of the plurality of bins provides access to each address of the target device;
an initiator device coupled to the target device and configured to:
perform a first search utilizing a first bin of the target device and the first plurality of ports;
perform a second search utilizing a second bin of the target device and the second plurality of ports;
wherein a first iteration of the first search begins at a first plurality of addresses and utilizes the first plurality of ports and the first bin from a plurality of bins of the target device; and
wherein a first iteration of the second search begins at a second plurality of addresses and utilizes the second plurality of ports and the second bin from the plurality of bins.

18. The apparatus of claim 17, wherein the first plurality of addresses has a first offset from the second plurality of addresses.

19. The apparatus of claim 18, wherein each address of the first plurality of addresses has a second offset from a different address of the first plurality of addresses.

20. The apparatus of claim 18, wherein each address of the second plurality of addresses has the second offset from a different address of the second plurality of addresses.

* * * * *